United States Patent
Billaud et al.

(10) Patent No.: US 7,408,497 B2
(45) Date of Patent: Aug. 5, 2008

(54) METHOD AND DEVICE FOR DETERMINING A REFERENCE VALUE OF A RESPONSE, IN PARTICULAR OF A MODE S RESPONSE RECEIVED BY A SECONDARY RADAR

(75) Inventors: Philippe Jean Billaud, Fontenay Aux Roses (FR); Claude Rene De Volder, Auffargis (FR)

(73) Assignee: Thales (FR)

( * ) Notice: Subject to any disclaimer, the term of this patent is extended or adjusted under 35 U.S.C. 154(b) by 304 days.

(21) Appl. No.: 10/576,360

(22) PCT Filed: Sep. 30, 2004

(86) PCT No.: PCT/EP2004/052384

§ 371 (c)(1),
(2), (4) Date: Apr. 19, 2006

(87) PCT Pub. No.: WO2005/040852

PCT Pub. Date: May 6, 2005

(65) Prior Publication Data

US 2007/0103229 A1     May 10, 2007

(30) Foreign Application Priority Data

Oct. 24, 2003    (FR)    ................... 03 12492

(51) Int. Cl.
*G01S 13/87*    (2006.01)
(52) U.S. Cl. .............................. 342/37; 342/32; 342/42; 342/195

(58) Field of Classification Search .................. 342/30, 342/32, 37, 42–46, 195
See application file for complete search history.

(56) References Cited

U.S. PATENT DOCUMENTS 5,220,329 A * 6/1993 Verbeke et al. ................. 342/40
5,387,915 A * 2/1995 Moussa et al. ................. 342/40
5,406,288 A * 4/1995 Billaud et al. ................. 342/37

(Continued)

FOREIGN PATENT DOCUMENTS

EP    2 654 217 A    5/1991

(Continued)

*Primary Examiner*—Isam Alsomiri
(74) *Attorney, Agent, or Firm*—Lowe Hauptman Ham & Berner, LLP

(57) ABSTRACT

The present invention applies to the surveillance of, in particular civil, air traffic, and more particularly, to cooperative aircraft ground systems which make it possible to pinpoint in radial distance and in azimuth the aircraft present in a certain volume and to interrogate them. A method and a device which makes it possible to determine a reference value of a response contained in a reception signal of a secondary radar, doing so even in the presence of strong pollution, in particular in the event of nesting between mode S responses. For this purpose the position of the pulses present is tagged in the reception signal; potential positions of pulses of the response considered are determined; time windows are selected, each time window tagging in the reception signal a stable part of a pulse whose position has been tagged and whose tagged position coincides with a determined potential position, the reference value being the value taken predominantly by samples of the reception signal, these samples being situated in the selected time windows.

8 Claims, 3 Drawing Sheets

U.S. PATENT DOCUMENTS 5,455,586 A * 10/1995 Barbier et al. ............... 342/37
6,788,245 B1 * 9/2004 Johnson ..................... 342/32

FOREIGN PATENT DOCUMENTS

| EP | 0 564 322 A | 10/1993 |
| EP | 0 577 478 A | 1/1994 |
| EP | 0 577 479 A | 1/1994 |
| EP | 0 577 480 A | 1/1994 |

* cited by examiner

METHOD AND DEVICE FOR DETERMINING A REFERENCE VALUE OF A RESPONSE, IN PARTICULAR OF A MODE S RESPONSE RECEIVED BY A SECONDARY RADAR

FIELD OF THE INVENTION

The present invention applies in particular to air traffic surveillance, and more particularly, to cooperative aircraft ground systems which make it possible to pinpoint in radial distance and in azimuth the aircraft present in a certain volume and to interrogate them.

BACKGROUND OF THE INVENTION

These cooperative systems comprise a so-called secondary surveillance radar and airborne transponders on board cooperative carrier vehicles, such as aircraft. The secondary radar cooperates according to a determined protocol with the transponders (also called responders). The secondary radar comprises an interrogator which emits interrogation pulses modulated in amplitude and in phase at the frequency of 1030 MHz to establish a communication with the transponders present in the emission lobe of its antenna. These transponders respond via trains of pulses modulated in amplitude at the frequency of 1090 MHz. These pulses are received and processed by a receiver of the secondary radar.

The secondary radars used in this application are called surveillance radars (known as "Secondary Surveillance Radar" or SSR). The International Civil Aviation Convention, also called the ICAO standard (International Civil Aviation Organization) defines a communication protocol for secondary radars in its annex 10 (Aeronautical Telecommunications), volume IV (Surveillance radar and anti-collision systems). The ICAO standard defines several interrogation modes, such as modes A, C and S. Mode S is distinguished from modes A and C in that it allows selective interrogation of aircraft by the use of an identification number specific to each aircraft.

A mode S response is composed of a preamble formed of a series of four pulses whose positions are invariable, followed by a data block composed of 56 or 112 binary values or bits, the binary values being coded over successive time intervals of 1 µs, by pulse position modulation. The last 24 bits of the data block form a cyclic redundancy code (CRC) and the other bits form a message. The CRC allows error-free decoding of the message when it has experienced a deterioration over a zone of less than 24 µs.

It turns out that the deterioration of the message often exceeds 24 µs in particular in cases of multipaths (where it can impinge on the entire message) and in cases of nesting of a response in mode S with several responses in conventional mode A or C.

Multipath phenomena occur frequently in the terminal zone when the aircraft is near the ground and near the interrogator of the secondary radar. They are due to reflections of the response of the transponder off buildings and off the ground which arrive shifted over time with respect to the direct response and perturb the latter.

French patent application No. 89 14416 "device for detecting signals of responders interrogated by a secondary radar in the presence of multipath phenomenon" (FR 2.654.217) filed on Nov. 3, 1989 describes a method for determining the average power of a mode S response by analyzing the histogram of the values of the possible pulses for the duration of a mode S response. This method is implemented by a device for detecting data pulses allowing the decoding of mode S responses in the presence of multipath phenomenon.

More precisely, the position of the preamble pulses is used to generate timing signals. The timing signals make it possible to gather three samples of the reception signal per interval of 0.5 µs, that is to say per potential position of a pulse of the data block. A first sample is taken in the middle of the interval, and the other two flank the first. The values of the first samples are plotted in a histogram, with a weighting calculated on the basis of the other two samples. A reference value of the mode S response is then determined on the basis of the histogram, the reference value reflecting the amplitude level of the data pulses of the mode S response. A data pulse is detected when the value of the sample in the middle of an interval of 0.5 µs is close to the reference value.

However, if the mode S response is nested with another mode S response, a majority of the samples is impaired. This affects in particular the samples taken in the middle of the intervals of 0.5 µs, whose values are used not only to detect individual data pulses, but also to determine the reference value. Consequently, this method is unsuitable in the event of nesting of two mode S responses, and more generally in the event of pollution by a multipath or by a nesting with a signal whose power is of the same order of magnitude or greater than the power of the response under analysis.

SUMMARY OF THE INVENTION

The invention has in particular the aim of establishing a reference value of a response, doing so even in the presence of significant pollution of the response, in particular when two responses in mode S are nested.

For this purpose, the subject of the invention is in particular a method for determining a reference value of a response contained in a reception signal of a secondary radar, the response comprising pulses arranged according to a determined protocol, method in which:

the position of the pulses present is tagged in the reception signal;
potential positions of pulses of the response considered are determined;
time windows are selected, each time window tagging in the reception signal a stable part of a pulse whose position has been tagged and whose tagged position coincides with a determined potential position, the reference value being the value taken predominantly by samples of the reception signal, these samples being situated in the selected time windows.

Thus, the samples are not systematically taken at the same position, that is to say in the middle of the interval of 0.5 µs. Only the samples presumed to be clear in a pulse are selected.

According to an advantageous mode of implementation, in the presence of nesting between several responses, when the time windows are selected to determine the reference value, the selection is limited to the time windows situated in a non-nested part of the response considered.

This makes it possible to determine references values of several responses when several responses are nested.

According to an advantageous mode of implementation, the position of the pulses present are tagged by detecting rising and/or falling edges in the reception signal.

According to an advantageous mode of implementation, related to the use of a position coding, the isolated pulses having a determined width, if the reception signal comprises a pulse seeming to have a duration greater than the determined width, not only the position of this pulse is tagged, but also the position of a masked pulse, the position of the masked pulse being deduced from the rising edge or from the falling edge of the long pulse to which is added or from which is deducted the determined width.

According to another advantageous mode of implementation, in the presence of nesting between several pulses, the position of the first pulse is tagged on the basis of a rising edge and the position of the last pulse is tagged on the basis of a falling edge.

According to an advantageous mode of implementation, the coincidence between the position of the pulses present in the reception signal on the one hand, and the position of potential data pulses on the other hand, is tested using a tolerance dependent on the accuracy of the tagging of the position of the pulses present in the reception signal.

The subject of the invention is also a method for detecting pulses of a response in which:
 a reference value is determined,
 the average value of the samples situated in a selected time window is determined;
 a pulse is detected each time that the average value determined belongs to a certain span of values centered around the reference value determined.

The subject of the invention is also a device for determining a reference value contained in a reception signal of a secondary radar, the response comprising pulses arranged according to a determined protocol, device comprising at least:
 means for tagging in the reception signal the position of the pulses present;
 means for determining potential positions of pulses of the response considered;
 means for selecting time windows, each time window tagging in the reception signal a stable part of a pulse whose position has been tagged and whose tagged position coincides with a determined potential position, the reference value being the value taken predominantly by samples of the reception signal, these samples being situated in the selected time windows.

The invention exhibits the advantage of increasing the signal-to-noise ratio and of increasing the signal-to-jammer ratio relative to the known techniques, by virtue of the use of a larger number of reception signal samples. Moreover, the method according to the invention is simple to implement.

BRIEF DESCRIPTION OF THE DRAWINGS

Other characteristics and advantages of the invention will appear on reading the following detailed description presented by way of nonlimiting illustration and given with reference to the appended figures, which represent.

DETAILED DESCRIPTION

Figure 1:
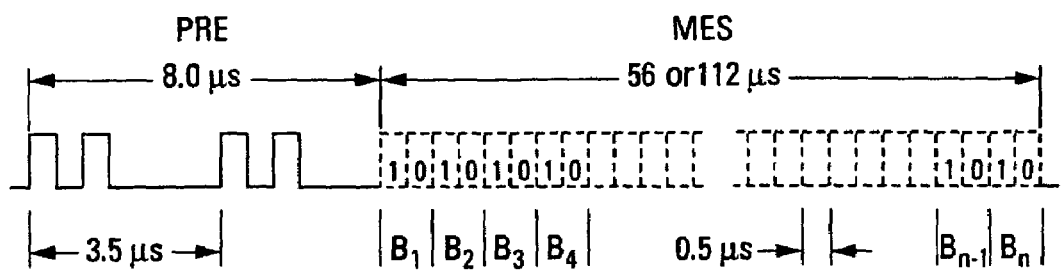
FIG. 1, the format of a mode S response according to the ICAO standard.

We now refer to FIG. 1 in which is represented the format of a mode S response according to the ICAO standard. A mode S response comprises a preamble PRE and data MES. The preamble comprises four pulses emitted at positions determined by the ICAO standard, to which the person skilled in the art may refer. The preamble pulses have a standardized width of 0.5 µs.

The preamble is followed by the data MES. The data MES comprise n binary values, referenced $B_1, B_2 \ldots B_n$. According to the type of response (short or long), the number of binary values n may be 56 or 112. Each binary value is coded over a period of 1 µs. Thus, the data of a mode S response occupy 56 or 112 µs.

The coding of the data is a position coding. For each binary value, a data pulse is present at the start or at the end of a period of 1 µs, the position of this pulse at the start or at the end of a period making it possible to code for a binary value 0 or 1. Over each period of 1 µs, the data pulse occupies a standardized width of 0.5 µs.

Figure 2:
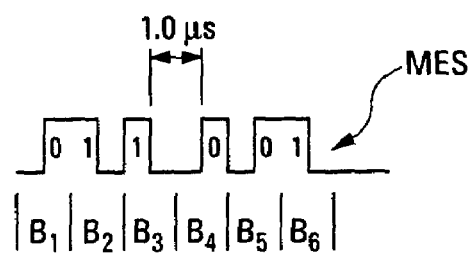
FIG. 2, an example of data pulses of a mode S response.

We now refer to FIG. 2 in which is represented an example of the start of the data of a mode S response. In this example, the first binary values $B_1$ to $B_6$ are respectively 0, 1, 1, 0, 0, 1. The maximum time during which no data pulse is emitted occurs when a value 0 follows a value 1 (between $B_3$ and $B_4$). This time is 1 µs. Likewise, the maximum time during which a data pulse is emitted occurs when a value 1 follows a value 0 (between $B_5$ and $B_6$). This time is also 1 µs, that is to say twice 0.5 µs, the data pulse straddling two periods of 1 µs.

Figure 3:
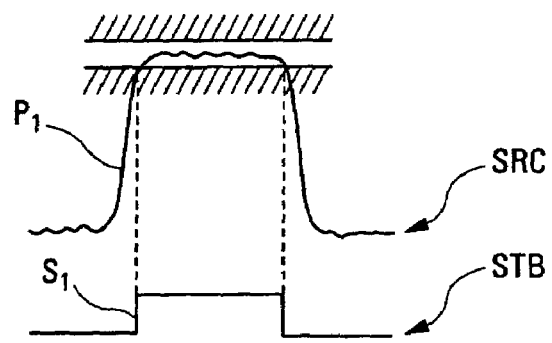
FIG. 3, an exemplary signal generated within the framework of an exemplary practical implementation of the invention, the signal comprising a time window tagging in the reception signal a stable part of a pulse whose position has been tagged.

We now refer to FIG. 3. A reception signal SRC is formulated, this signal being sampled at a period greater than the duration of a data pulse. The devices formulating the reception signals are in themselves known and will not be described. The reception signal SRC is representative of the power received by the antenna, and is conventionally called LOGΣ. The sampling frequency of the reception signal SRC can be 20 MHz, thereby corresponding to a sampling period of 50 ns. This makes it possible to have of the order of 10 samples in a data pulse over a period of 1 µs.

According to a practical embodiment of the invention, a signal STB is generated making it possible to tag the parts with stable level of the pulses present in the reception signal. Thus, a slot $S_1$ is generated in the signal STB, this slot being associated with the pulse $P_1$ present in the signal SRC.

To tag the stable parts of a pulse, various principles can be employed. For example, a pulse can be deemed stable when the dispersion of the powers of the samples with respect to the average of the powers is bounded by a maximum dispersion value. Several parameters can be taken into account to determine the value of the maximum dispersion, that is to say to define the stability of a pulse. The value of the maximum dispersion can depend in particular on the power tolerance that the ICAO standard permits for a transponder. It is possible to add a margin to this power tolerance, this margin allowing for the noise level of the reception signal and the measurement errors of the receiver of the secondary radar. According to a practical embodiment, the maximum dispersion can be tabulated as a function of the average power, so as to allow for variations in the noise with the power of the signal, the noise level increasing with the power of the reception signal.

It is possible to tag the stable parts of a pulse by using another method, such as that described in patent application No. 92 03868 "method and device for detecting mixtures of pulses received by a secondary radar" (FR 2 689 250). According to this method, use is made of not only the power signal, but also an off-boresight angle signal, conventionally denoted Δ/Σ (also designated by the acronym OBA in the literature).

In a general manner, the tagging of the stable parts of a pulse is based on the analysis of the shape of one or more reception signals, each reception signal comprising several samples per pulse. More precisely, one investigates whether the samples of a signal lie inside a determined bracket. The extent of this bracket can be a parameter tabulated as a function of the level of the signal.

Figure 4:
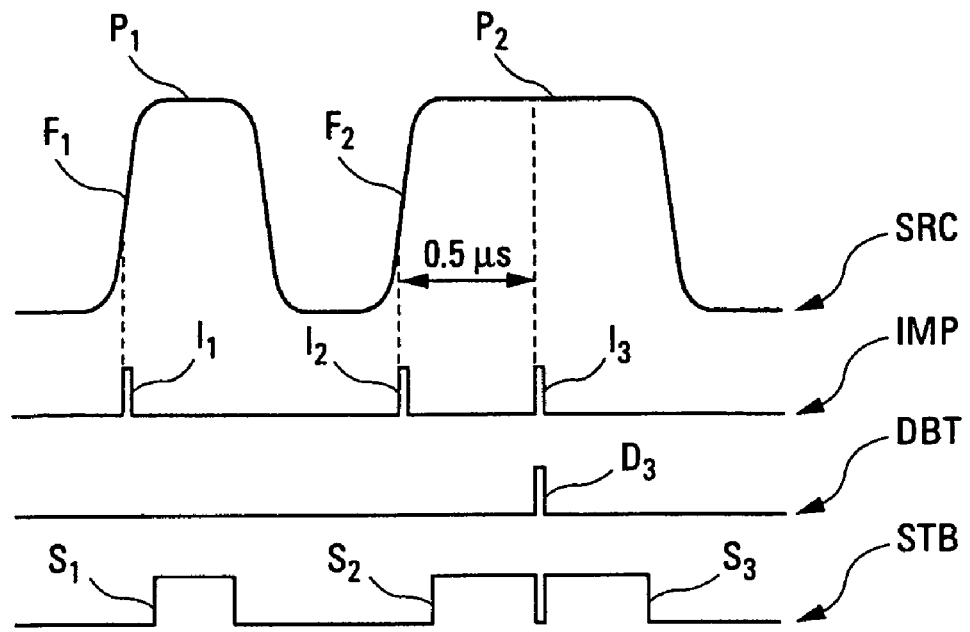
FIG. 4, an exemplary reception signal of an extract of a mode S response, an exemplary signal generated within the framework of an exemplary practical implementation of the invention, the signal tagging in the reception signal the position of the pulses present, and examples of signals generated in advantageous embodiments of the invention.

We now refer to FIG. 4 in which is represented an exemplary reception signal corresponding to the sequence of binary values $B_4$, $B_5$, $B_6$ represented in FIG. 2. The reception signal SRC comprises two pulses $P_1$, $P_2$. According to the invention, the shape of the reception signal is analyzed to tag the position of the pulses present in the reception signal. For example, the pulses can be tagged on the basis of their rising edge and/or falling edge. According to a practical mode of implementation of the invention, a tagging signal for the pulses IMP is generated. In this example, the positions of the pulses $P_1$ and $P_2$ are tagged on the basis of their respective rising edges $F_1$ and $F_2$. The tagging signal IMP thus comprises indications $I_1$ and $I_2$ of the start of these pulses.

The two pulses $P_1$ and $P_2$ correspond in fact to three binary values. The pulse $P_1$ corresponds to the binary value $B_4$. The pulse $P_2$ corresponds at one and the same time to the binary values $B_5$ and $B_6$. The tagging signal IMP therefore lacks information making it possible to process the binary value $B_6$. This is related to the position coding, in which a single pulse of a duration twice the duration of an isolated data pulse is generated during a particular succession of binary values 0-1.

According to an advantageous embodiment, related to the use of a position coding, not only the position of the pulses present in the reception signal is tagged, but also the position of masked pulses in the situations where a single pulse is emitted for two binary values. For example, when the position of the pulses is tagged on the basis of the rising edges, the position of a masked pulse is tagged during a succession of binary values 0-1, the rising edge of the masked pulse being positioned at the start of the period of 1 µs corresponding to the binary value 1.

To tag the position of a masked pulse, the long pulses are identified from among the pulses present in the reception signal, a long pulse being a pulse whose duration is greater than a normal width of a pulse coding for an isolated binary value. For each long pulse identified, not only a signal for tagging the long pulse is generated, but also a signal for tagging a masked pulse. The position of the signal for tagging the masked pulse can be deduced from the rising edge or from the falling edge of the long pulse.

For example when the pulses are tagged by their rising edges, a rising edge is added in the tagging signal 0.5 µs after the rising edge of each long pulse. Alternatively, a rising edge is added in the tagging signal 0.5 µs before the falling edge of each long pulse.

In a general manner, the data pulses coding for an isolated binary value having a determined width, if the reception signal comprises a pulse seeming to have a duration greater than the determined width, not only the position of this pulse is tagged, but also the position of a masked pulse, the position of the masked pulse being deduced from the rising edge or from the falling edge of the long pulse to which is added or from which is deducted the determined width.

In this example applied to the decoding of mode S responses, this determined width is 0.5 µs. Thus, the tagging signal IMP comprises an indication $I_3$ corresponding to a rising edge of a masked pulse, this rising edge making it possible to tag the position of a masked data pulse, this data pulse corresponding to the binary value $B_6$.

Figure 5:
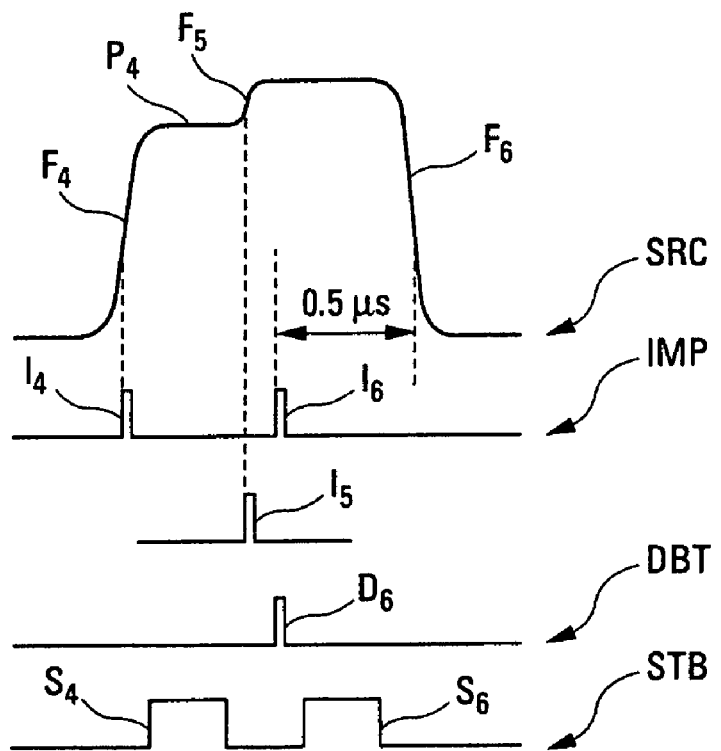
FIG. 5, another exemplary reception signal, in the presence of nesting of two pulses originating from different transponders, an exemplary signal generated within the framework of an exemplary practical implementation of the invention, and examples of signals generated in advantageous embodiments of the invention.

We now refer to FIG. 5 in which is represented an exemplary reception signal in the presence of nesting of two pulses originating for example from different transponders or from multipath phenomena. This nesting manifests itself by the presence of a pulse $P_4$ in the reception signal SRC, the pulse $P_4$ comprising two consecutive rising edges $F_4$ and $F_5$ and a falling edge $F_6$.

The rising edges $F_4$ and $F_5$ can be used to respectively tag two positions $I_4$ and $I_5$ of pulses. The falling edge $F_6$ can be used to tag a pulse position $I_6$, the tagged position being offset by a normal data pulse width (that is to say 0.5 µs) with respect to the falling edge, so as to tag the theoretical position of the start of the pulse.

Preferably, in the presence of nesting between several pulses, the position of the first pulse is tagged on the basis of a rising edge and the position of the last pulse is tagged on the basis of a falling edge. The non-nested parts of the pulses are thus used to tag the position thereof, thereby affording better accuracy. In the example of FIG. 5, a tagging is thus performed on the basis of the falling edge $F_6$, thereby making it possible to indicate a pulse at the position $I_6$ in the tagging signal IMP.

In this advantageous embodiment, the rising edge $F_5$ is not used. Stated otherwise, the tagging signal IMP comprises the position indications $I_4$ and $I_6$ and not the position indication $I_5$. Specifically, the position indications $I_5$ and $I_6$ correspond to one and the same pulse.

Figure 6:
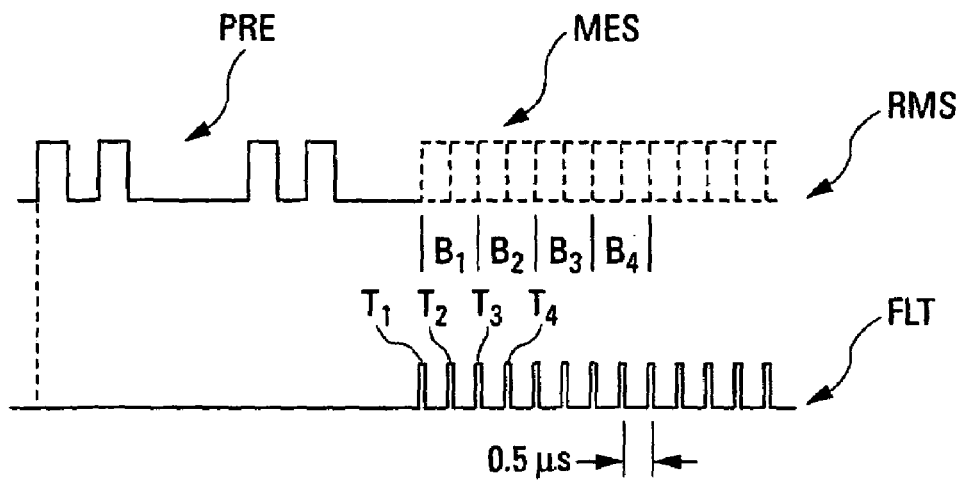
FIG. 6, an exemplary signal generated within the framework of an exemplary practical implementation of the invention, during the determination of the potential positions of data pulses of a mode S response considered.

We now refer to FIG. 6. When a response whose data pulses are sought is identified in the reception signal, potential positions of data pulses of the response considered are determined. A response, for example in mode S, can be identified on the basis of its preamble pulses.

There exist other methods for identifying mode S responses in a reception signal. Mention may be made for example of the method described in the French patent application No. 03 11893 "method for predetecting responses in a secondary radar and application to the detection of mode S responses". According to this method, to identify a mode S response, a sequence of pulses of 56 or 112 µs corresponding to data pulses of a short or long mode S response is recognized, the time interval separating a pulse from that which precedes it not being able to exceed 1 µs according to the ICAO standard.

In this example, the response considered RMS is a mode S response. The data pulses can be positioned either at the start or at the end of a period of 1 µs. Consequently, there are two potential positions per period of 1 µs, that is to say a potential pulse every 0.5 µs. According to a practical embodiment, a filtering signal FLT is generated making it possible to tag the potential positions $T_1$, $T_2$, $T_3$, $T_4$ of the data pulses of the response considered.

Thereafter a reference value of the response considered is determined. The reference value is an average value of a reception signal in the presence of a data pulse. The reference value can be based on the LOGΣ signal for example. The reference value can be based on another signal. For example, it is possible to determine a reference value of the off-boresight angle signal. This makes it possible to evaluate the azimuthal position (with respect to the radioelectric axis of the secondary radar) of the transponder having emitted the response. It is possible also to determine a reference value of the signal on the difference channel, conventionally called the LOGΔ signal.

The determination of one or more reference values can be used to perform a correct decoding of the bits of the message of a mode S response. Normally, all the pulses which belong to a single response are at the same level in the reception signal (power on the sum channel, power on the difference channel, off-boresight angle, frequency of the response of the transponder). The determination of one or more reference values makes it possible to compare the level of a reception signal with the reference value corresponding to this reception signal. As a function of the result of this comparison, a pulse may not be recognized as belonging or not belonging to the response considered.

To determine a reference value of an arbitrary reception signal (LOGΣ, LOGΔ, etc.), time windows are selected, each time window tagging in the reception signal a stable part of a pulse whose position has been tagged and whose tagged position coincides with a determined potential position, the reference value being the value taken predominantly by samples of the reception signal, these samples being situated in the selected time windows.

According to a practical embodiment, the tagging signal IMP is used, which tags the position of the pulses present (visible or masked pulses) in the reception signal. The filtering signal FLT is used to retain only the pulses whose tagged position coincides with a potential data pulse position. Thereafter, the samples of the reception signal SRC situated in the windows of the signal STB which correspond to the pulses retained are selected. It is possible thereafter to determine the reference value on the basis of a histogram of the selected samples. Stated otherwise, the reference value can be determined by selecting the level taken predominantly by the selected samples of the reception signal. For example, the reference value can be the peak of the histogram. According to another implementation mode, the reference value can be the average of the values of the histogram which belong to a span of values attained a number of times equal to at least half the number of times where the value of the predominant level is attained.

According to an advantageous embodiment, the coincidence between the position of the pulses present in the reception signal on the one hand, and the position of potential data pulses on the other hand, is tested using a tolerance dependent on the accuracy of the tagging of the position of the pulses present in the reception signal. According to a practical embodiment, a doubt signal DBT is generated, indicating a doubt as regards the position of a pulse tagged in the tagging signal IMP. The doubt signal DBT can for example (see FIG. 4) indicate a doubt $D_3$ as regards the position of the masked pulses $I_3$, which are determined in an indirect manner (using the format of the response considered). The doubt signal DBT can also (see FIG. 5) indicate a doubt $D_6$ as regards the position of a pulse $I_6$, when two procedures for determining the position of this pulse do not give the same results (positions $I_5$ and $I_6$).

According to a practical embodiment, the filtering signal FLT comprises time windows, for example of 50 ns to 100 ns, whose width is more significant in the presence of a doubt in the doubt signal DBT. Thus, the filtering signal FLT makes it possible to perform the coincidence test with a variable tolerance.

Thus, a reference value is obtained with significant accuracy, despite the presence of noise or pollution, by virtue of a prior filtering of the samples at the level of each pulse. The method can be improved by adding a filtering at the response level, and not only at the samples level.

Figure 7:
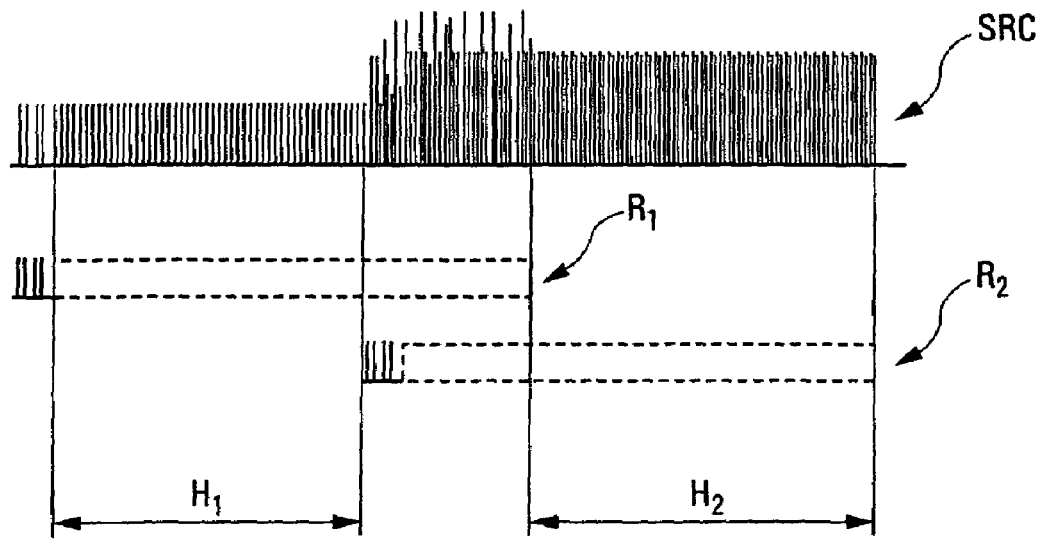
FIG. 7, an exemplary use, within the framework of an advantageous embodiment of the invention, of the reception signal resulting from a nesting of two mode S responses.

We refer to FIG. 7 in which is represented a signal during a nesting between two mode S responses. The start $H_1$ of the first response $R_1$ is a so-called clear zone, that is to say non-nested with other responses. The end $H_2$ of the last response $R_2$ is also a clear zone. According to an advantageous embodiment, in the presence of nesting between several responses, when the time windows are selected to determine the reference value, the selection is limited to the time windows situated in a non-nested part of the response considered. According to the practical embodiment described, the filtering signal FLT is limited to the temporal zone $H_1$ when considering the first response $R_1$. This makes it possible to have available a histogram exhibiting a narrow peak, even in the presence of nesting between two mode S responses.

The method described can be implemented by using means known to the person skilled in the art, such as hard-wired logic circuits or programmed circuits. The signals IMP, DBT, FLT, described by way of example, can be digital or analog signals. Preferably, these signals are sampled at the period of the reception signal SRC.

If two mode S responses are nested, the invention makes it possible not only to determine reference values of the first response, but also to determine reference values of the second response. The filtering of the non-nested parts of the responses makes it possible to select solely the samples:

belonging to a single response, and not polluted by other signals.

Accurate reference values are thus available, determined on the basis of selected samples, but sufficiently numerous to calculate a reliable average thereof.

Of course the invention can apply to fields other than air traffic surveillance. Mention may be made for example of a military application of the invention, in which secondary radars are stowed on board carrier vehicles (for example ACAS), these secondary radars operating without emitting any interrogation message (or very rarely) but by analyzing messages emitted in a spontaneous manner or in response to interrogations of other secondary radars, these messages having the format of a standardized response. Mention may also be made of a civil application of the invention, in which the secondary radar is on board a carrier vehicle such as an aircraft or a boat, the onboard secondary radar being used as anti-collision radar.

The invention claimed is:

1. A method for determining a reference value of a response contained in a reception signal of a secondary radar, the response comprising pulses arranged according to a determined protocol, method in which:

the position of the pulses present is tagged (IMP) in the reception signal (SRC);

potential positions of pulses of the response considered are determined (FLT);

time windows are selected, each time window tagging in the reception signal a stable part (STB) of a pulse whose position has been tagged and whose tagged position coincides with a determined potential position, the reference value being the value taken predominantly by samples of the reception signal, these samples being situated in the selected time windows.

2. The method as claimed in claim 1 in which in the presence of nesting between several responses, when the time windows are selected to determine the reference value, the selection is limited to the time windows situated in a non-nested part of the response considered.

3. The method as claimed in claim 1 in which the position of the pulses present are tagged by detecting rising and/or falling edges in the reception signal.

4. The method as claimed in claim 3 in which the isolated pulses having a determined width, if the reception signal comprises a pulse seeming to have a duration greater than the determined width, not only the position of this pulse is tagged, but also the position of a masked pulse, the position of the masked pulse being deduced from the rising edge or from the falling edge of the long pulse to which is added or from which is deducted the determined width.

5. The method as claimed in claim 3 in which in the presence of nesting between several pulses, the position of the first pulse is tagged on the basis of a rising edge and the position of the last pulse is tagged on the basis of a falling edge.

6. The method as claimed in claim 1 in which the coincidence between the position of the pulses present in the reception signal on the one hand, and the position of potential data pulses on the other hand, is tested using a tolerance dependent on the accuracy of the tagging of the position of the pulses present in the reception signal.

7. A method for detecting pulses of a response in which:
a reference value is determined according to any one of the preceding claims,
the average value of the samples situated in a selected time window is determined;
a pulse is detected each time that the average value determined belongs to a certain span of values centered around the reference value determined.

8. A device for determining a reference value of a response contained in a reception signal of a secondary radar, the response comprising pulses arranged according to a determined protocol, device comprising at least:
means for tagging (IMP) in the reception signal (SRC) the position of the pulses present;
means for determining (FLT) the potential positions of pulses of the response considered;
means for selecting time windows, each time window tagging in the reception signal a stable part (STB) of a pulse whose position has been tagged and whose tagged position coincides with a determined potential position, the reference value being the value taken predominantly by samples of the reception signal, these samples being situated in the selected time windows.

* * * * *